Oct. 25, 1932.  T. P. KIRKPATRICK  1,883,948
CONTROL SYSTEM
Filed Jan. 19, 1927
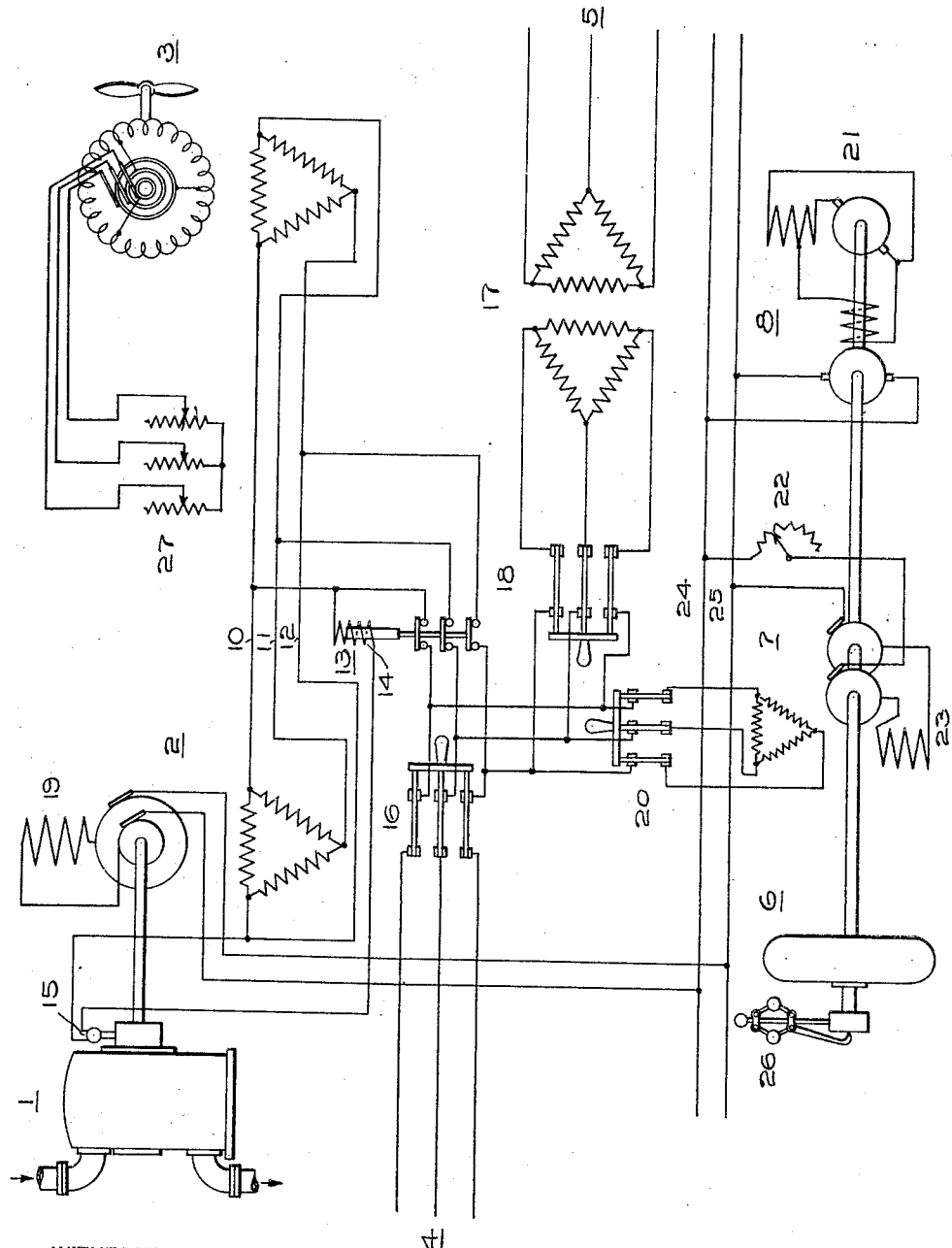
WITNESSES:
R. S. Harrison
Joe. E. Dickinson
INVENTOR
Thomas P. Kirkpatrick
BY
Wesley G. Carr
ATTORNEY Patented Oct. 25, 1932

1,883,948

UNITED STATES PATENT OFFICE

THOMAS P. KIRKPATRICK, OF DECATUR, GEORGIA, ASSIGNOR TO WESTINGHOUSE ELECTRIC & MANUFACTURING COMPANY, A CORPORATION OF PENNSYLVANIA

CONTROL SYSTEM

Application filed January 19, 1927. Serial No. 162,042.

My invention relates to control systems and more particularly to control systems for electrically propelled ships.

One object of my invention is to provide an improved control system of electric ship propulsion.

More particularly, an object of the invention is to provide a control system for ships which is not only effective for propelling and maneuvering the ship, but, at the same time, provides a source of energy for auxiliary devices employed on the ship.

A further object of my invention is to provide means for carrying the entire ship's distribution load on the main generating units under normal conditions.

Another object of the invention is to provide an auxiliary unit which will respond automatically, when the ship is being maneuvered, to carry the auxiliary load. By such a provision, standard alternating-current equipment may be employed in connection with auxiliary devices.

A still further object of my invention is to provide a separate unit not only for carrying the auxiliary load when the main circuit is varied or the main generator is overloaded during maneuvering periods, but also for correcting the power-factor in the main circuit during normal operating conditions, thus allowing smaller main units to be employed.

Another object of my invention is to provide for the utilization of the auxiliary unit to aid the main generators during periods of overload and, in case of failure of the main generator, to provide for propelling the ship by the auxiliary units.

Further objects of my invention will become apparent from the following specification, taken in connection with the accompanying drawing, the single figure of which is a diagrammatic view showing a ship-propulsion system organized in accordance with my invention.

Referring to the drawing, a main turbine 1 is directly coupled to a main generator 2 which is electrically connected to a propulsion motor 3. An auxiliary high-voltage distribution circuit 4 and a low-voltage distribution circuit 5 are also connected to the main-generator circuit through line switches 16 and 18, respectively, and a common relay 13. An auxiliary unit comprising a turbine 6, coupled directly to a dynamo-electric machine or synchronous motor 7, a direct-current generator 8 and an exciter 21, completes the system. A switch 20 is provided for connecting the stator winding of the dynamo-electric machine 7 to the circuit of the main generator 2.

Assuming that the main turbine 1 is driving the main generator 2 under normal conditions, the stator winding of propulsion motor 3 will be directly connected to conductors 10, 11 and 12 of the three-phase source provided by the main generator 2. Relay 13 has its actuating coil 14 connected across one phase of the main-generator circuit through suitable contact members on an oil pressure gauge 15 or other control device that acts as a circuit interrupter. The gauge is operatively associated with the shaft of the main driving turbine 1, thus being responsive, in a well known manner, to variations in speed of said turbine, and acts as a controlling element for circuits 4 and 5, being arranged to maintain the relay 13 closed under normal operating conditions. When the speed of the turbine 1 falls below a certain degree, the contact members associated with the conventional turbine speed governor or gauge 15 are closed to thereby energize the actuating coils 14 of the relay 13. When the contact members are closed and the coil 14 energized, the switch members of the relay 13 will open to disconnect the main generator from the auxiliary work circuits 4 and 5 and the dynamo-electric machine 7.

The relay being closed, the auxiliary high-voltage circuit 4 and the low-voltage circuit 5 will be connected to the main circuit through their respective line switches 16 and 18 and the common relay 13. The low-voltage circuit 5 has a suitably reduced voltage impressed upon it by means of a transformer 17.

The field winding 19 of the main generator 2 and the field winding 23 of the dynamo-electric machine 7 are energized from conductors 24 and 25 which are connected to the direct-current generator 8 provided to supply the direct-current auxiliary units on the ship. The direct-current generator, under normal operating conditions, is driven by the dynamo-electric machine 7 which is connected to the main conductors 10, 11 and 12, through a line switch 20 and the relay 13, to act as a motor. The auxiliary turbine 6, the dynamo-electric machine 7, the direct-current generator 8, and the exciter 21, which supplies energy to the field windings of the direct-current generator, are all coupled to the same shaft and thus rotate as a unit, the driving torque being supplied either by the machine 7 or by the turbine 6, depending on operating conditions.

A rheostat 22 is connected in series relation with the field winding 23 of the dynamo-electric machine 7 across the direct-current conductors 24 and 25. By means of the rheostat 22, the dynamo-electric machine or synchronous motor 7 may be made to draw a leading or lagging current from the main-generator circuit, depending upon the variations of the current in the field winding 23, and thus act as a means for correcting the power-factor of the main generator circuit, thereby permitting smaller machines to be used for propulsion purposes as well as smaller auxiliary driving elements.

Under normal operating conditions, the main generator 2 will be so regulated by a suitable turbine governor (not shown), or otherwise, as to generate a voltage of standard or predetermined frequency for driving the propulsion motor as well as the auxiliary devices. Inasmuch as, in ships utilizing such a system, the speed of the propelling motors is controlled by varying the speed of the driving turbines, by regulating the steam in the usual manner, the frequency of the main circuit will be correspondingly varied. Since standard alternating-current equipment operates satisfactorily only on a voltage of substantially uniform frequency, it is necessary to have a source of energy of substantially constant frequency available at all times, for supplying the auxiliary demand, at such times as the main generator is generating current at a frequency lower than that at which the auxiliary apparatus will operate.

The auxiliary turbine 6, being regulated automatically by a centrifugal device 26 of well-known construction, sufficient steam is permitted to flow through it to maintain proper heating conditions when it is being rotated by the dynamo-electric machine 7, whenever that machine is operating as a motor. Also, the regulator 26, being responsive to any variations in the speed of the turbine, will regulate the steam to maintain substantially uniform turbine speed, so that the turbine will take up the driving load of the auxiliary unit a moment before the frequency of the main circuit falls below a predetermined value.

The relay 13, in this system, is arranged to have its actuating coil 14 energized when the speed of the main turbine 1 drops, because of a given load or a given overload, to a predetermined value, through the action of the oil-pressure gauge 15, which acts as an interrupter in the coil circuit. Obviously, the speed-responsive device 26 may also be arranged to control the relay 13. The relay 13 will thus be opened when the frequency of the main circuit is below a predetermined value. Upon the opening of this relay, the auxiliary circuits 4 and 5 will be disconnected from the main circuit but will remain connected through their respective line switches 16 and 18 to the dynamo-electric machine 7 through its line switch 20.

When the dynamo-electric machine 7 is disconnected from the main circuit 10, 11 and 12 by the opening of the relay 13, by reason of such variation in speed of the main driving turbine 1, it will cease acting as a motor, and, since its speed is maintained substantially constant by the auxiliary turbine 6, which is, under these conditions, operating as a driving element, it will generate energy for supplying the auxiliary circuits 4 and 5 with a voltage of substantially uniform frequency.

The compound-wound exciter 21 is so constructed that it will vary the excitation of the direct-current generator 8 for maintaining a substantially constant direct-current voltage over the range of variation of speed of the dynamo-electric machine 7, while it is changing from a motor to a generator.

By manually regulating the auxiliary turbine 6, while the relay 13 is closed, and the frequency of the current generated by the main generator 2 has not fallen below a predetermined value, it may be made to drive the dynamo-electric machine 7 as a generator to aid the main generator 1, when operating under overload conditions. It is also possible to propel the ship from the auxiliary dynamo-electric machine 7, driven as a generator by the auxiliary turbine 6, should the main generator 2 fail, by connecting the propulsion motor 3 to the dynamo-electric machine 7 through the relay 13 and the line switch 20.

The speed of a ship using this system is usually regulated by controlling the speed of the main turbine, but a further means of reducing the speed of the propelling motor 3 is here provided by arranging a variable resistor 27 to be connected in series relation with the rotor windings of the propelling motor.

While I have shown my invention in a preferred form, it is apparent that modifications may be made in the arrangement of circuits and apparatus employed without departing from the spirit of my invention, and it will be understood that I do not limit my invention to the specific apparatus illustrated, but desire that only such limitations shall be imposed as are indicated in the appended claims.

I claim as my invention:

1. A control system comprising a main generator constituting a source of energy, a driving unit for said generator and a propulsion motor driven by said generator, direct-current and alternating-current auxiliary distribution circuits, a dynamo-electric machine, a direct-current generator and an exciter therefor, an auxiliary driving unit for driving said dynamo-electric machine, direct-current generator and exciter, means for connecting said auxiliary alternating-current distribution circuit to said main generator, means for connecting said dynamo-electric machine to said main generator to drive said direct-current generator and exciter, means responsive to predetermined variations in the load conditions on the main generator for disconnecting the auxiliary alternating-current circuit therefrom and automatically controlling said auxiliary driving unit to drive said dynamo-electric machine as a generator for maintaining a predetermined characteristic of said auxiliary circuits substantially uniform and also drive said direct-current generator and exciter.

2. A control system for ship propulsion comprising a turbo-alternator, a propulsion motor, a resistor adapted to be connected in the motor circuit, the speed of said propulsion motor being governed by the speed of the main turbine in conjunction with said resistor, an auxiliary distribution circuit, an auxiliary turbine, a dynamo-electric machine coupled thereto, a direct-current generator and an exciter therefor, said dynamo-electric machine being normally connected to said alternator to run as a motor driving said direct-current generator and being adapted for correcting the power-factor in the alternator circuit, means responsive to predetermined variations in the speed of said alternator for disconnecting the auxiliary circuit therefrom and automatically causing the auxiliary turbine to drive said dynamo-electric machine as a generator and also to drive said direct-current generator and exciter whereby said auxiliary circuits are maintained in an energized condition.

3. A control system comprising a main generator, a driving unit therefor, a main distribution circuit, an auxiliary direct-current circuit, an auxiliary driving unit, a dynamo-electric machine, a direct-current generator and a compound wound exciter coupled thereto, means for connecting said dynamo-electric machine to said main generator to act as a motor for driving said direct-current generator under normal conditions, means responsive to predetermined load conditions of said main generator for disconnecting said dynamo-electric machine therefrom, and means for thereupon automatically controlling said auxiliary driving unit for driving said direct-current generator and said compound wound exciter, said exciter being adapted to maintain the direct-current voltage of said generator substantially uniform over the operating range.

4. In a ship-propulsion system, in combination, a main turbo-alternator, a propulsion motor connected to said alternator, a plurality of auxiliary circuits connected to said alternator, an auxiliary turbo-alternator, a plurality of direct current dynamo-electric machines disposed for operation by said auxiliary turbo-alternator, means for connecting said auxiliary circuits and auxiliary alternator to said main alternator, said auxiliary alternator being disposed for operation as a motor when the speed of the main alternator is above a predetermined value to drive said auxiliary turbo and dynamo-electric machines, said auxiliary turbo being disposed to drive said auxiliary alternator and dynamo-electric machines when the frequency of the current developed by the main alternator has dropped below a predetermined value, and means responsive to the speed of said main turbo for disconnecting the auxliary alternator and circuits from the main alternator when the frequency of the main alternator current has dropped below said low value.

5. A control system for ship propulsion comprising a main turbo-generator, a propulsion motor, auxiliary distribution circuits, means for connecting said propulsion motor and auxiliary circuits to said generator, the speed of the propulsion motor being governed by the speed of the main turbine, an auxiliary turbine and a dynamo-electric machine coupled thereto, means responsive to predetermined speed conditions of the main turbo-generator for disconnecting the auxiliary circuits therefrom and causing the auxiliary turbine to operate the auxiliary dynamo-electric machine as a generator to thereby maintain said auxiliary circuits energized, and means for automatically regulating said turbine to maintain a predetermined characteristic of its circuits substantially uniform.

In testimony whereof, I have hereunto subscribed my name this 8th day of January, 1927.

THOMAS P. KIRKPATRICK.